(12) United States Patent
Carney et al.

(10) Patent No.: US 8,440,315 B2
(45) Date of Patent: *May 14, 2013

(54) MATTE FINISH POLYIMIDE FILMS AND METHODS RELATING THERETO

(75) Inventors: Thomas Edward Carney, Orient, OH (US); Jeffrey Michael Bartolin, Westerville, OH (US); Meredith L. Dunbar, Canal Winchester, OH (US); Scott John Herrmann, Gahanna, OH (US)

(73) Assignee: E.I. du Pont de Nemours & Company

( * ) Notice: Subject to any disclaimer, the term of this patent is extended or adjusted under 35 U.S.C. 154(b) by 0 days.

This patent is subject to a terminal disclaimer.

(21) Appl. No.: 13/486,284

(22) Filed: Jun. 1, 2012

(65) Prior Publication Data

US 2012/0251808 A1    Oct. 4, 2012

Related U.S. Application Data

(63) Continuation of application No. 12/842,174, filed on Jul. 23, 2010.

(60) Provisional application No. 61/230,934, filed on Aug. 3, 2009.

(51) Int. Cl.
```
B32B 27/28    (2006.01)
B32B 27/38    (2006.01)
B32B 5/16     (2006.01)
```

(52) U.S. Cl.
USPC ........ 428/473.5; 428/323; 428/331; 428/332; 428/402; 428/414

(58) Field of Classification Search .................. 428/323, 428/331, 332, 402, 414, 473.5
See application file for complete search history.

(56) References Cited

U.S. PATENT DOCUMENTS

| | | |
|---|---|---|
| 4,677,528 A | 6/1987 | Miniet |
| 4,778,872 A | 10/1988 | Sasaki et al. |
| 5,031,017 A | 7/1991 | Pernyeszi et al. |
| 5,166,308 A | 11/1992 | Kreuz et al. |
| 5,302,652 A | 4/1994 | Parish |
| 5,358,782 A | 10/1994 | Parish |
| 6,794,031 B2 | 9/2004 | Murakami et al. |
| 6,908,685 B2 | 6/2005 | Uhara et al. |
| 7,550,194 B2 | 6/2009 | Simone et al. |
| 2004/0142191 A1 | 7/2004 | Mei-Yen et al. |
| 2004/0142831 A1 | 7/2004 | Jager Lezer |
| 2004/0249019 A1 | 12/2004 | Meyer et al. |
| 2005/0080228 A1 | 4/2005 | Silvi et al. |
| 2005/0096429 A1* | 5/2005 | Lee et al. ............ 525/178 |
| 2005/0164022 A1 | 7/2005 | Kliesch et al. |
| 2007/0025740 A1 | 2/2007 | Katoh et al. |
| 2007/0158869 A1 | 7/2007 | Yanagida et al. |
| 2009/0022939 A1 | 1/2009 | Yanagida et al. |
| 2009/0062505 A1 | 3/2009 | Miyamoto |

FOREIGN PATENT DOCUMENTS

| | | |
|---|---|---|
| CA | 708896 | 5/1965 |
| EP | 0 441 321 A2 | 8/1991 |
| EP | 0 659 553 A1 | 6/1995 |
| EP | 879839 A1 * | 11/1998 |
| EP | 1 484 351 A | 12/2004 |
| EP | 1 732 362 A1 | 12/2006 |
| EP | 2 072 580 A1 | 6/2009 |
| EP | 2 218 754 A1 | 8/2010 |
| GB | 2 176 193 A | 12/1986 |
| JP | 07126585 | 5/1995 |
| JP | 2004221169 A * | 8/2004 |
| WO | WO 2005/061200 A1 | 7/2005 |
| WO | 2007/078857 A2 | 7/2007 |
| WO | 2008/060302 A1 | 5/2008 |
| WO | PCT/US10/25756 | 3/2010 |

OTHER PUBLICATIONS

Foster, J.K. Special Blacks Division Cabot Corporation. "Effects of Carbon Black Properties on Conductive Coatings" International Exhibition of Paint Industry Suppliers (1991).*
Machine translation of JP 2004221169 (2013).*
HP0176PCT Search Report, (Jul. 25, 2011).
U.S. Appl. No. 61/158,074, filed Mar. 6, 2009, Carney et al.
U.S. Appl. No. 12/850,739, filed Aug. 5, 2010, Carney et al.
HP0176 PCT1 Search Report, (Jul. 25, 2011).
HP0182 PCT Search Report, (Oct. 12, 2010).

* cited by examiner

Primary Examiner — Callie Shosho
Assistant Examiner — John Freeman
(74) Attorney, Agent, or Firm — Dickstein Shapiro LLP

(57) ABSTRACT

The present disclosure is directed to a base film having a thickness from 8 to 152 microns, a 60 degree gloss value from 2 to 35, an optical density greater than or equal to 2 and a dielectric strength greater than 1400 V/mil. The base film comprises a chemically converted (partially or wholly aromatic) polyimide in an amount from 71 to 96 weight percent of the base film. The base film further comprises a pigment and a matting agent. The matting agent is present in an amount from 1.6 to 10 weight percent of the base film, has a median particle size from 1.3 to 10 microns, and has a density from 2 to 4.5 g/cc. The pigment is present in an amount from 2 to 9 weight percent of the base film. The present disclosure is also directed to coverlay films comprising the base film in combination with an adhesive layer.

16 Claims, No Drawings

MATTE FINISH POLYIMIDE FILMS AND METHODS RELATING THERETO

This application is a continuation of application Ser. No. 12/842,174, filed on Jul. 23, 2010, which claims the benefit of provisional Application No. 61/230,934, filed on Aug. 3, 2009, the entire disclosures of which are incorporated herein by reference thereto.

FIELD OF DISCLOSURE

The present disclosure relates generally to matte finish base films that are useful in coverlay applications and have advantageous dielectric and optical properties. More specifically, the matte finish base films of the present disclosure comprise a relatively low concentration of pigment and matting agent in a polyimide film imidized by a chemical (as opposed to a thermal) conversion process.

BACKGROUND OF THE DISCLOSURE

Broadly speaking, coverlays are known as barrier films for protecting electronic materials, e.g., for protecting flexible printed circuit boards, electronic components, leadframes of integrated circuit packages and the like. A need exists however, for coverlays to be increasingly thin and low in cost, while not only having acceptable electrical properties (e.g., dielectric strength), but also having acceptable structural and optical properties to provide security against unwanted visual inspection and tampering of the electronic components protected by the coverlay.

SUMMARY OF THE INVENTION

The present disclosure is directed to a base film. The base film comprises a chemically converted polyimide in an amount from 71 to 96 weight percent of the base film. The chemically converted polyimide is derived from: i. at least 50 mole percent of an aromatic dianhydride, based upon a total dianhydride content of the polyimide, and ii. at least 50 mole percent of an aromatic diamine based upon a total diamine content of the polyimide. The base film further comprises: a low conductivity carbon black present in an amount from 2 to 9 weight percent of the base film; and a matting agent that:
  a. is present in an amount from 1.6 to 10 weight percent of the base film,
  b. has a median particle size from 1.3 to 10 microns, and
  c. has a density from 2 to 4.5 g/cc.
In one embodiment, the base film has: i. a thickness from 8 to 152 microns; ii. a 60 degree gloss value from 2 to 35; iii. an optical density greater than or equal to 2; and iv. a dielectric strength greater than 1400 V/mil. The present disclosure is also directed to coverlay films comprising the base film in combination with an adhesive layer.

DETAILED DESCRIPTION OF THE INVENTION

Definitions

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only to those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

"Dianhydride" as used herein is intended to include precursors or derivatives thereof, which may not technically be a dianhydride but would nevertheless react with a diamine to form a polyamic acid which could in turn be converted into a polyimide.

"Diamine" as used herein is intended to include precursors or derivatives thereof, which may not technically be a diamine but would nevertheless react with a dianhydride to form a polyamic acid which could in turn be converted into a polyimide.

"Polyamic acid" as used herein is intended to include any polyimide precursor material derived from a combination of dianhydride and diamine monomers or functional equivalents thereof and capable of conversion to a polyimide via a chemical conversion process.

"Prepolymer" as used herein is intended to mean a relatively low molecular weight polyamic acid solution which is prepared by using a stoichiometric excess of diamine in order to give a solution viscosity of approximately 50-100 Poise.

"Chemical conversion" or "chemically converted" as used herein denotes the use of a catalyst (accelerator) or dehydrating agent (or both) to convert the polyamic acid to polyimide and is intended to include a partially chemically converted polyimide which is then dried at elevated temperatures to a solids level greater than 98%.

"Finishing solution" herein denotes a dianyhdride in a polar aprotic solvent which is added to a prepolymer solution to increase the molecular weight and viscosity. The dianhydride used is typically the same dianhydride used (or one of the same dianhydrides when more than one is used) to make the prepolymer.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers, unless the context indicates or implies otherwise.

The materials, methods, and examples herein are illustrative only and, except as specifically stated, are not intended to be limiting. Although methods and materials similar or equivalent to those described herein can be used in the practice or testing of the present invention, suitable methods and materials are described herein.

Base Film

The base films of the present disclosure comprise a filled polyimide matrix, where the polyimide is created by a chemical conversion process. One advantage of a chemical conversion process (over a solely thermal conversion process) is that the amount of matting agent necessary to achieve sufficient low gloss is at least 10, 20, 30, 40 or 50 percent less than if a thermal conversion process is used. Generally accepted ranges for 60 degree gloss values are:

| | |
|---|---|
| <10 | flat |
| 10-70 | matte, satin, semi-gloss (various terms are used) |
| >70 | glossy. |

In some embodiments, the base film has a 60 degree gloss value between and optionally including any two of the following: 2, 3, 4, 5, 10, 15, 20, 25, and 35. In some embodiments, the base film has a 60 degree gloss value from 2 to 35. In some embodiments, the base film has a 60 degree gloss value from 10 to 35. The 60 degree gloss value is measured using Micro-TRI-Gloss gloss meter. The lower loading of matting agent (made possible by the chemical conversion) is advantageous, because it: i. lowers overall cost; ii. simplifies the dispersion of matting agent into the polyamic acid (or other polyimide precursor material); and iii. provides the resulting base film with better mechanical properties (e.g., less brittleness). Another advantage of a chemical conversion process (over a thermal conversion process) is that the dielectric strength of the chemically converted base films is higher. In some embodiments, the base film dielectric strength is greater than 1400 V/mil (55 V/micron).

In a chemical conversion process, the polyamic acid solution is either immersed in or mixed with conversion (imidization) chemicals. In one embodiment, the conversion chemicals are tertiary amine catalysts (accelerators) and anhydride dehydrating materials. In one embodiment, the anhydride dehydrating material is acetic anhydride, which is often used in molar excess relative to the amount of amic acid (amide acid) groups in the polyamic acid, typically about 1.2 to 2.4 moles per equivalent of polyamic acid. In one embodiment, a comparable amount of tertiary amine catalyst is used.

Alternatives to acetic anhydride as the anhydride dehydrating material include: i. other aliphatic anhydrides, such as, propionic, butyric, valeric, and mixtures thereof; ii. anhydrides of aromatic monocarboxylic acids; iii. Mixtures of aliphatic and aromatic anhydrides; iv. carbodimides; and v. aliphatic ketenes (ketenes may be regarded as anhydrides of carboxylic acids derived from drastic dehydration of the acids).

In one embodiment, the tertiary amine catalysts are pyridine and beta-picoline and are typically used in amounts similar to the moles of anhydride dehydrating material. Lower or higher amounts may be used depending on the desired conversion rate and the catalyst used. Tertiary amines having approximately the same activity as the pyridine, and beta-picoline may also be used. These include alpha picoline; 3,4-lutidine; 3,5-lutidine; 4-methylpyridine; 4-isopropyl pyridine; N,N-dimethylbenzyl amine; isoquinoline; 4-benzyl pyridine, N,N-dimethyldodecyl amine, triethyl amine, and the like. A variety of other catalysts for imidization are known in the art, such as imidazoles, and may be useful in accordance with the present disclosure.

The conversion chemicals can generally react at about room temperature or above to convert polyamic acid to polyimide. In one embodiment, the chemical conversion reaction occurs at temperatures from 15° C. to 120° C. with the reaction being very rapid at the higher temperatures and relatively slower at the lower temperatures.

In one embodiment, the chemically treated polyamic acid solution can be cast or extruded onto a heated conversion surface or substrate. In one embodiment, the chemically treated polyamic acid solution can be cast on to a belt or drum. The solvent can be evaporated from the solution, and the polyamic acid can be partially chemically converted to polyimide. The resulting solution then takes the form of a polyamic acid-polyimide gel. Alternately, the polyamic acid solution can be extruded into a bath of conversion chemicals consisting of an anhydride component (dehydrating agent), a tertiary amine component (catalyst) or both with or without a diluting solvent. In either case, a gel film is formed and the percent conversion of amic acid groups to imide groups in the gel film depends on contact time and temperature but is usually about 10 to 75 percent complete. For curing to a solids level greater than 98%, the gel film typically must be dried at elevated temperature (from about 200° C., up to about 550° C.), which will tend to drive the imidization to completion. In some embodiments, the use of both a dehydrating agent and a catalyst is preferred for facilitating the formation of a gel film and achieve desired conversion rates.

The gel film tends to be self-supporting in spite of its high solvent content. Typically, the gel film is subsequently dried to remove the water, residual solvent, and remaining conversion chemicals, and in the process the polyamic acid is essentially completely converted to polyimide (i.e., greater than 98% imidized). The drying can be conducted at relatively mild conditions without complete conversion of polyamic acid to polyimide at that time, or the drying and conversion can be conducted at the same time using higher temperatures.

Because the gel has so much liquid that must be removed during the drying and converting steps, the gel generally must be restrained during drying to avoid undesired shrinkage. In continuous production, the base film can be held at the edges, such as in a tenter frame, using tenter clips or pins for restraint.

High temperatures can be used for short times to dry the base film and induce further imidization to convert the gel film to a polyimide base film in the same step. In one embodiment, the base film is heated to a temperature of 200° C. to 550° C. Generally, less heat and time are required for thin films than for thicker films.

During such drying and converting (from polyamic acid to polyimide), the base film can be restrained from undue shrinking and, in fact, may be stretched by as much as 150 percent of its initial dimension. In film manufacture, stretching can be in either the longitudinal direction or the transverse direction or both. If desired, restraint can also be adjusted to permit some limited degree of shrinkage.

Another advantage is the chemically converted base films of the present disclosure are matte on both sides, even if cast onto a smooth surface. If both sides of the base film are matte, any additional layers may be applied to either side of the base film. In contradistinction, when similarly filled polyimide precursor films are solely thermally converted and cast on a smooth surface, the cast side tends to be glossy and the air side tends to be matte.

Yet another advantage is chemically converted base films have higher dielectric strength compared to solely thermally converted base film. Typically, the dielectric strength decreases as the amount of matting agent increases. So while low 60 degree gloss value can be achieved (air side only) in the solely thermal process, by increasing the amount of matting agent, the dielectric strength will decrease.

In one embodiment, the polyamic acids are made by dissolving approximately equimolar amounts of a dianhydride and a diamine in a solvent and agitating the resulting solution under controlled temperature conditions until polymerization of the dianhydride and the diamine is completed. Typically a slight excess of one of the monomers (usually diamine) is used to initially control the molecular weight and viscosity which can then be increased later via small additional amounts of the deficient monomer. Examples of suitable dianhydrides for use in the polyimides of the present disclosure include aromatic dianhydrides, aliphatic dianhydrides and mixtures thereof. In one embodiment, the aromatic dianhydride is selected from the group consisting of:
pyromellitic dianhydride;
3,3',4,4'-biphenyl tetracarboxylic dianhydride;
3,3',4,4'-benzophenone tetracarboxylic dianhydride;
4,4'-oxydiphthalic anhydride;
3,3',4,4'-diphenyl sulfone tetracarboxylic dianhydride;
2,2-bis(3,4-dicarboxyphenyl)hexafluoropropane;
Bisphenol A dianhydride; and
mixtures and derivatives thereof.
In another embodiment, the aromatic dianhydride is selected from the group consisting of:
2,3,6,7-naphthalene tetracarboxylic dianhydride;
1,2,5,6-naphthalene tetracarboxylic dianhydride;
2,2',3,3'-biphenyl tetracarboxylic dianhydride;
2,2-bis(3,4-dicarboxyphenyl)propane dianhydride;
bis(3,4-dicarboxyphenyl)sulfone dianhydride;
3,4,9,10-perylene tetracarboxylic dianhydride;
1,1-bis(2,3-dicarboxyphenyl)ethane dianhydride;
1,1-bis(3,4-dicarboxyphenyl)ethane dianhydride;
bis(2,3-dicarboxyphenyl)methane dianhydride;
bis(3,4-dicarboxyphenyl)methane dianhydride;
oxydiphthalic dianhydride;
bis(3,4-dicarboxyphenyl)sulfone dianhydride;
mixtures and derivatives thereof.
Examples of aliphatic dianhydrides include
cyclobutane dianhydride;
[1S*,5R*,6S]-3-oxabicyclo[3.2.1]octane-2,4-dione-6-spiro-3-(tetrahydrofuran-2,5-dione);
mixtures thereof.

Examples of suitable diamines for use in the polyimides of the present disclosure include aromatic diamines, aliphatic diamines and mixtures thereof. In one embodiment, the aromatic diamine is selected from a group consisting of:
3,4'-oxydianiline;
1,3-bis-(4-aminophenoxy)benzene;
4,4'-oxydianiline;
1,4-diaminobenzene;
1,3-diaminobenzene;
2,2'-bis(trifluoromethyl)benzidene;
4,4'-diaminobiphenyl;
4,4'-diaminodiphenyl sulfide;
9,9'-bis(4-amino)fluorine;
mixtures and derivatives thereof.
In another embodiment, the aromatic diamine is selected from a group consisting of:
4,4'-diaminodiphenyl propane;
4,4'-diamino diphenyl methane;
benzidine;
3,3'-dichlorobenzidine;
3,3'-diamino diphenyl sulfone;
4,4'-diamino diphenyl sulfone;
1,5-diamino naphthalene;
4,4'-diamino diphenyl diethylsilane;
4,4'-diamino diphenysilane;
4,4'-diamino diphenyl ethyl phosphine oxide;
4,4'-diamino diphenyl N-methyl amine;
4,4'-diamino diphenyl N-phenyl amine;
1,4-diaminobenzene(p-phenylene diamine);
1,2-diaminobenzene;
Mixtures and derivatives thereof.
Examples of suitable aliphatic diamines include
hexamethylene diamine,
dodecane diamine,
cyclohexane diamine;
and mixtures thereof.

In one embodiment, the chemically converted polyimide is derived from pyromellitic dianhydride ("PMDA") and 4,4'-oxydianiline ("4,4 ODA"). In one embodiment, the polyimides of the present disclosure are copolyimides derived from any of the above diamines and dianhydrides. In one embodiment, the copolyimide is derived from 15 to 85 mole % of biphenyltetracarboxylic dianhydride, 15 to 85 mole % pyromellitic dianhydride, 30 to 100 mole % p-phenylenediamine and optionally including 0 to 70 mole % of 4,4'-diaminodiphenyl ether and/or 4,4'-diaminodiphenyl ether. Such copolyimides are further described in U.S. Pat. No. 4,778,872 and U.S. Pat. No. 5,166,308.

In one embodiment, the polyimide dianhydride component is pyromellitic dianhydride ("PMDA") and the polyimide diamine component is a combination of 4,4'-oxydianiline ("4,4 ODA") and p-phenylenediamine ("PPD"). In one embodiment the polyimide dianhydride component is pyromellitic dianhydride ("PMDA") and the polyimide diamine component is a combination of 4,4'-oxydianiline ("4,4 ODA") and p-phenylenediamine ("PPD"), where the ratio of ODA to PPD (ODA:PPD) is any of the following mole ratios: i. 20-80:80-20; ii. 50-70:50-30; or iii. 55-65:45-35. In one embodiment the polyimide dianhydride component is PMDA, and the diamine component is a mole ratio of ODA to PPD (ODA:PPD) of about 60:40.

In one embodiment, the polyimide dianhydride component is 3,3',4,4'-biphenyltetracarboxylic dianhydride ("BPDA") and the polyimide diamine component is a combination of 4,4'-oxydianiline ("4,4 ODA") and p-phenylenediamine ("PPD"). In one embodiment the polyimide dianhydride component is BPDA and the polyimide diamine component is a combination of 4,4 ODA and PPD, where the ratio of ODA to PPD (ODA:PPD) is any of the following mole ratios: i. 20-80:80-20; ii. 50-70:50-30; or iii. 55-65:45-35. In one embodiment the polyimide dianhydride component is BPDA, and the diamine component is a mole ratio of ODA to PPD (ODA:PPD) of about 60:40.

In one embodiment, the polyamic acid solvent must dissolve one or both of the polymerizing reactants and in one embodiment, will dissolve the polyamic acid polymerization product. The solvent should be substantially unreactive with all of the polymerizing reactants and with the polyamic acid polymerization product.

In one embodiment the polyamic acid solvent is a liquid N,N-dialkylcarboxylamide, such as, a lower molecular weight carboxylamide, particularly N,N-dimethylformamide and N,N-diethylacetamide. Other useful compounds of this class of solvents are N,N-diethylformamide and N,N-diethylacetamide. Other solvents which may be used are sulfolane, N-methyl-2-pyrrolidone, tetramethyl urea, dimethylsulfone, and the like. The solvents can be used alone or in combinations with one another. The amount of solvent used preferably ranges from 75 to 90 weight % of the polyamic acid.

The polyamic acid solutions are generally made by dissolving the diamine in a dry solvent and slowly adding the dianhydride under conditions of agitation and controlled temperature in an inert atmosphere.

Pigment

Virtually any pigment (or combination of pigments) can be used in the performance of the present invention. In some embodiments, useful pigments include but are not limited to the following: Barium Lemon Yellow, Cadmium Yellow Lemon, Cadmium Yellow Lemon, Cadmium Yellow Light, Cadmium Yellow Middle, Cadmium Yellow Orange, Scarlet Lake, Cadmium Red, Cadmium Vermilion, Alizarin Crimson, Permanent Magenta, Van Dyke brown, Raw Umber Greenish, or Burnt Umber. In some embodiments, useful black pigments include: cobalt oxide, Fe—Mn—Bi black, Fe—Mn oxide spinel black, (Fe,Mn)2O3 black, copper chromite black spinel, lampblack, bone black, bone ash, bone char, hematite, black iron oxide, micaceous iron oxide, black complex inorganic color pigments (CICP), $CuCr_2O_4$ black, $(Ni,Mn,Co)(Cr,Fe)_2O_4$ black, Aniline black, Perylene black, Anthraquinone black, Chromium Green-Black Hematite, Chrome Iron Oxide, Pigment Green 17, Pigment Black 26, Pigment Black 27, Pigment Black 28, Pigment Brown 29, Pigment Black 30, Pigment Black 32, Pigment Black 33 or mixtures thereof.

In some embodiments, a low conductivity carbon black is used. The amount of low conductivity carbon black and the thickness of the base film will generally impact the optical density. If the low conductivity carbon black loading level is unduly high, the base film will be conductive even when a low conductivity carbon black is used. If too low, the base film may not achieve the desired optical density and color. The low conductivity carbon black, for the purpose of this disclosure, is used to impart the black color to the base film as well as to achieve the desired optical density of a base film having a thickness between and optionally including any two of the following: 8, 10, 15, 20, 25, 30, 35, 40, 45, 50, 60, 70, 80, 90, 100, 110, 120, 130, 140 and 152 microns. In some embodiments, the base film thickness is from 8 to 152 microns. In some embodiments, the base film thickness is from 8 to 127 microns. In yet another embodiment, the base film thickness is from 10 to 40 microns. Low conductivity carbon black is intended to mean, channel type black or furnace black. In some embodiments a bone black may be used to impart the black color. In one embodiment, the low conductivity carbon black is present in amount between and optionally including any two of the following: 2, 3, 4, 5, 6, 7, 8 and 9 weight percent of the base film. In some embodiments, the optical density (opacity) desirable (e.g., to hide the conductor traces in the flex circuits from view) is greater than or equal to 2. An optical density of 2 is intended to mean $1 \times 10^{-2}$ or 1% of light is transmitted through the base film.

In some embodiments, the low conductivity carbon black is a surface oxidized carbon black. One method for assessing the extent of surface oxidation (of the carbon black) is to measure the carbon black's volatile content. The volatile content can be measured by calculating weight loss when calcined at 950° C. for 7 minutes. Generally speaking, a highly surface oxidized carbon black (high volatile content) can be readily dispersed into a polyamic acid solution (polyimide precursor), which in turn can be imidized into a (well dispersed) filled polyimide base polymer of the present disclosure. It is thought that if the carbon black particles (aggregates) are not in contact with each other, then electron tunneling, electron hopping or other electron flow mechanism are generally suppressed, resulting in lower electrical conductivity. In some embodiments, the low conductivity carbon black has a volatile content greater than or equal to 1%. In some embodiments, the low conductivity carbon black has a volatile content greater than or equal to 5, 9, or 13%. In some embodiments, furnace black may be surface treated to increase the volatile content.

A uniform dispersion of isolated, individual particles (aggregates) not only decreases the electrical conductivity, but additionally tends to produce uniform color intensity. In some embodiments the low conductivity carbon black is milled. In some embodiments, the mean particle size of the low conductivity carbon black is between (and optionally including) any two of the following sizes: 0.2, 0.3, 0.4, 0.5, 0.6, 0.7, 0.8, 0.9 and 1.0 microns. The thickness of the base film can be tailored to the specific application.

In some embodiments, dyes may be used. Examples of useful dye are, but not limited to nigrosin black, monoazo chromium complex black, or mixtures thereof. In some embodiments, a mixture of dye and pigment may be used.

Matting Agent

Polymeric materials typically have inherent surface gloss. To control gloss (and thereby produce matte surface characteristics) various additive approaches are possible to achieve dull and low gloss surface characteristics. Broadly speaking, the additive approaches are all based upon the same fundamental physics—to create a modified surface which is (on a micro-scale) coarse and irregular shaped and therefore allows less light to be reflected back to the distant (e.g., greater than 50 centimeters) observer. When multiple rays of light hit a glossy surface, most of the light is reflected with similar angle and therefore a relatively high level of light reflectance can be observed. When the same source of light hits a matte (ie. irregular) surface, the light is scattered in many different directions and also a much higher fraction is absorbed. Hence on rough surfaces, light tends to be diffusely scattered in all directions, and the image forming qualities are largely diminished (reflected objects no longer appear brilliant, but blurred).

Gloss meters used to characterize a specific surface for gloss level are based on this same principle. Typically, a light source hits a surface at a fixed angle and after reflection the amount of reflected light is read by a photo cell. Reflection can be read at multiple angles. Maximum gloss performance for a perfectly glossy surface tends to demonstrate 100% reflection, whereas a fully dull surface tends to demonstrate 0% reflection.

Silicas are inorganic particles that can be ground and filtered to specific particle size ranges. The very irregular shape and porosity of silica particles and low cost make it a popular matting agent. Other potential matting agents can include: i, other ceramics, such as, borides, nitrides, carbides and other oxides (e.g., alumina, titania, etc); and ii, organic particles, provided the organic particle can withstand the temperature processing of a chemically converted polyimide (processing temperatures of from about 250° C. to about 550° C., depending upon the particular polyimide process chosen). One matting agent that can be useful in polyimide applications (can withstand the thermal conditions of polyimide synthesis) is polyimide particles.

The amount of matting agent, median particle size and density must be sufficient to produce the desired 60 degree gloss value. In some embodiments, the base film 60 degree gloss value is between and optionally including any two of the following: 2, 5, 10, 15, 20, 25, 30 and 35. In some embodiments, the base film 60 degree gloss value is from 10 to 35.

In some embodiments, the matting agent is present in an amount between and optionally including any two of the following: 1.6, 2, 3, 4, 5, 6, 7, 8, 9 and 10 weight percent of base film. In some embodiments, the matting agent has a median particle size between and optionally including any two of the following: 1.3, 2, 3, 4, 5, 6, 7, 8, 9 and 10 microns. The matting agent particles should have an average particle size of less than (or equal to) about 10 microns and greater than (or equal to) about 1.3 microns. Larger matting agent particles may negatively impact mechanical properties of the final base film. In some embodiments, the matting agent has a density between and optionally including any two of the following: 2, 3, 4 and 4.5 g/cc. In some embodiments, when the amount of matting agent is below 1.6 weight percent of base film, the desired 60 degree gloss value is not achieved even when the matting agent median particle size and density are in the desired ranges. In some embodiments, when the median particle size is below 1.3 microns, the desired 60 degree gloss value is not achieved even when the amount of matting agent and density are in the desired ranges. In some embodiments, the matting agent is selected from the group consisting of silica, alumina, barium sulfate and mixtures thereof.

The base film can be prepared by any method well known in the art for making a chemically converted, filled polyimide layer. In one such embodiment, a slurry comprising a low conductivity carbon black is prepared and a matting agent slurry is prepared. The slurries may or may not be milled using a ball mill to reach the desired particle size. The slurries may or may not be filtered to remove any residual large particles. A polyamic acid solution can be made by methods well known in the art. The polyamic acid solution may or may not be filtered. In some embodiments, the solution is mixed in a high shear mixer with the low conductivity carbon black slurry and the matting agent slurry. When a polyamic acid solution is made with a slight excess of diamine, additional dianhydride solution may or may not be added to increase the viscosity of the mixture to the desired level for film casting. The amount of the polyamic acid solution, low conductivity carbon black slurry, and matting agent slurry can be adjusted to achieve the desired loading levels in the cured base film. In some embodiments the mixture is cooled below 0° C. and mixed with conversion chemicals prior to casting onto a heated rotating drum or belt in order to produce a partially imidized gel film. The gel film may be stripped from the drum or belt, placed on a tenter frame, and cured in an oven, using convective and radiant heat to remove solvent and complete the imidization to greater than 98% solids level.

Adhesive

In some embodiments, the base film is a multilayer film comprising the base film and an adhesive layer. The base film of the present disclosure can comprise an adhesive layer for maintaining the base film in place, once applied. In one embodiment, the adhesive consists of an epoxy resin and hardener, and, optionally, further contains additional components, such as, an elastomer, curing accelerator (catalyst), hardener, filler and flame retardant.

In some embodiments, the adhesive is an epoxy resin. In some embodiments, the epoxy resin is selected from the group consisting of:
  Bisphenol F type epoxy resin,
  Bisphenol S type epoxy resin,
  Phenol novolac type epoxy resin,
  Biphenyl type epoxy resin,
  Biphenyl aralkyl type epoxy resin,
  Aralkyl type epoxy resin,
  Dicyclopetadiene type epoxy resin,
  Multifunctional type epoxy resin,
  Naphthalene type epoxy resin,
  Rubber modified epoxy resin, and
  mixtures thereof.

In another embodiment, the adhesive is an epoxy resin selected from the group consisting of bisphenol A type epoxy resin, cresol novolac type epoxy resin, phosphorus containing epoxy resin, and mixtures thereof. In some embodiments, the adhesive is a mixture of two or more epoxy resins. In some embodiments, the adhesive is a mixture of the same epoxy resin having different molecular weights.

In some embodiments, the epoxy adhesive contains a hardener. In one embodiment, the hardener is a phenolic compound. In some embodiments, the phenolic compound is selected from the group consisting of:
  Novolac type phenol resin,
  Aralkyl type phenol resin,
  Biphenyl aralkyl type phenol resin,
  Multifunctional type phenol resin,
  Nitrogen containing phenol resin,
  Dicyclopetadiene type phenol resin,
  Phosphorus containing phenol resin, and
  Triazine containing phenol novolac resin.
In another embodiment, the hardener is an aromatic diamine compound. In some embodiments, the aromatic diamine compound is a diaminobiphenyl compound. In some embodiments, the diaminobiphenyl compound is 4,4'-diaminobiphenyl or 4,4'-diamino-2,2'-dimethylbiphenyl. In some embodiments, the aromatic diamine compound is a diaminodiphenylalkane compound. In some embodiments, the diaminodiphenylalkane compound is 4,4'-diaminodiphenylmethane or 4,4'-diaminodiphenylethane. In some embodiments, the aromatic diamine compound is a diaminodiphenyl ether compound. In some embodiments, the diaminodiphenyl ether compounds is 4,4'-diaminodiphenylether or di(4-amino-3-ethylphenyl)ether. In some embodiments, the aromatic diamine compound is a diaminodiphenyl thioether compound. In some embodiments, the diaminodiphenyl thioether compound is 4,4'-diaminodiphenyl thioether or di(4-amino-3-propylphenyl)thioether. In some embodiments, the aromatic diamine compound is a diaminodiphenyl sulfone compound. In some embodiments, the diaminodiphenyl sulfone compound is 4,4'-diaminodiphenyl sulfone or di(4-amino-3-isopropylphenyl)sulfone. In some embodiments, the aromatic diamine compound is phenylenediamine. In one embodiment, the hardener is an amine compound. In some embodiments, the amine compound is a guanidine. In some embodiments, the guanidine is dicyandiamide (DICY). In another embodiment, the amine compound is an aliphatic diamine. In some embodiments, the aliphatic diamine is ethylenediamine or diethylenediamine.

In some embodiments, the epoxy adhesive contains a catalyst. In some embodiments, the catalyst is selected from the group consisting of imidazole type, triazine type, 2-ethyl-4-methyl-imidazole, triazine containing phenol novolac type and mixtures thereof.

In some embodiments, the epoxy adhesive contains a elastomer toughening agent. In some embodiments, the elastic toughening agent is selected from the croup consisting of ethylene-acryl rubber, acrylonitrile-butadiene rubber, carboxy terminated acrylonitrile-butadiene rubber and mixtures thereof.

In some embodiments, the epoxy adhesive contains a flame retardant. In some embodiments, the flame retardant is selected from the group consisting of aluminum trihydroxide, melamine polyphosphate, condensed polyphosphate ester, other phosphorus containing flame retardants and mixtures thereof.

In some embodiments, the adhesive layer is selected from the group consisting of:

polyimide,
butyral phenolic,
polysiloxane,
polyimidesiloxane,
fluorinated ethylene propylene copolymers,
perfluoroalkoxy copolymers,
ethylene vinyl acetate copolymers,
ethylene vinyl acetate glycidyl acrylate terpolymer,
ethylene vinyl acetate glycidyl methacrylate terpolymer,
ethylene alkyl acrylate copolymers with adhesion promotor,
ethylene alkyl methacrylate copolymers with adhesion promotor,
ethylene glycidyl acrylate,
ethylene glycidyl methacrylate,
ethylene alkyl acrylate glycidyl acrylate terpolymer,
ethylene alkyl methacrylate glycidyl acrylate terpolymer,
ethylene alkyl acrylate maleic anhydride terpolymers,
ethylene alkyl methacrylate maleic anhydride terpolymers,
ethylene alkyl acrylate glycidyl methacrylate terpolymers,
ethylene alkyl methacrylate glycidyl methacrylate terpolymers,
alkyl acrylate acrylonitrile acrylic acid terpolymers,
alkyl acrylate acrylonitrile methacrylic acid terpolymers,
ethylene acrylic acid copolymer including salts thereof,
ethylene methacrylic acid copolymer including salts thereof,
alkyl acrylate acrylonitrile glycidyl methacrylate terpolymers,
alkyl methacrylate acrylonitrile glycidyl methacrylate terpolymers,
alkyl acrylate acrylonitrile glycidyl acrylate terpolymers,
alkyl methacrylate acrylonitrile glycidyl acrylate terpolymers,
polyvinyl butyral,
ethylene alkyl acrylate methacrylic acid terpolymers and salts thereof,
ethylene alkyl methacrylate methacrylic acid terpolymers and salts thereof,
ethylene alkyl acrylate acrylic acid terpolymers and salts thereof
ethylene alkyl methacrylate acrylic acid terpolymers and salts thereof,
ethylene ethyl hydrogen maleate,
ethylene alkyl acrylate ethyl hydrogen maleate,
ethylene alkyl methacrylate ethyl hydrogen maleate,
and mixtures thereof.

In some embodiments, the multilayer film is a coverlay film.

In the following examples all parts and percentages are by weight unless otherwise indicated.

EXAMPLES

The invention will be further described in the following examples, which is not intended to limit the scope of the invention described in the claims.

Optical density was measured with a Macbeth TD904 optical densitometer. The average of 5-10 individual measurements was recorded.

60 degree gloss value was measured with a Micro-TRI-Gloss gloss meter, Gardner USA, Columbia, Md. The average of 5-10 individual measurements was recorded.

Surface resistivity was measured using a Advantest Model R8340 ultra high resistance meter with a UR type concentric ring probe and was measured at 1000 volts. The average of 3-5 individual measurements was recorded.

Dielectric strength was measured using a Beckman Industrial AC Dielectric Breakdown Tester, according to ASTM D149. The average of 5-10 individual measurements was recorded.

Median particle size was measured using a Horiba LA-930 particle size analyzer. Horiba, Instruments, Inc., Irvine Calif. DMAC (dimethylacetamide) was used as the carrier fluid.

When a continuous film casting process was used to produce samples, an ashing process was used to confirm the amount of matting agent in the film. The film was ashed by heating in a furnace at 900° C. to burn off all of the polymer and low conductivity carbon black, leaving only a white matting agent residue. Comparing weights before and after ashing shows the amount of matting agent the film contains.

Polyamic acid viscosity measurements were made on a Brookfield Programmable DV-II+ viscometer using either an RV/HA/HB #7 spindle or an LV #5 spindle. The viscometer speed was varied from 5 to 100 rpm to provide an acceptable percent torque value. Readings were temperature corrected to 25° C.

Examples 1-5 demonstrate that chemical conversion achieves low 60 degree gloss value (matte appearance) on both sides of base film as well as high dielectric strength with low amounts of matting agent.

Example 1

A carbon black slurry was prepared, consisting of 80 wt % DMAC, 10 wt % polyamic acid prepolymer solution (20.6 wt % polyamic acid solids in DMAC), and 10 wt % low conductivity carbon black powder (Special Black 4, from Evonik Degussa). The ingredients were thoroughly mixed in a rotor stator, high-speed dispersion mill. The slurry was then processed in a ball mill to disperse any large agglomerates and to achieve the desired particle size. The median particle size of the slurry was 0.3 microns.

A silica slurry was prepared, consisting of 75.4 wt % DMAC, 9.6 wt % polyamic acid prepolymer solution (20.6 wt % polyamic acid solids in DMAC), and 15.0 wt % silica powder (Syloid® C 803, from W. R. Grace Co.). The ingredients were thoroughly mixed in a high shear rotor-stator type mixer. Median particle size was 3.3-3.6 microns.

16.4 kg of the carbon black slurry was mixed into 158 kg of a PMDA/4,4'ODA prepolymer solution (20.6% polyamic acid solids, approximately 50 Poise viscosity) in a 50 gallon (189.3 liters) tank. The tank was equipped with three independently controlled agitator shafts: a low speed anchor mixer, a high speed disk disperser, and a high shear rotor-stator emulsifier. The mixture was "finished" by adding and mixing, in increments, approximately 7 kg. of a 5.8 wt % PMDA solution in DMAC, in order to increase molecular weight and viscosity to approximately 3000 Poise. The speeds of the anchor, disperser, and emulsifier were adjusted as necessary to ensure efficient mixing and dispersion, without excessively heating the mixture. Temperature of the mixture was further regulated by flowing chilled ethylene glycol through the mixing tank jacket. The finished solution was filtered through a 20 micron filter and vacuum degassed to remove entrained air.

The silica slurry was metered into a metered stream of the finished polymer/carbon black mixture and thoroughly mixed using a high shear rotor-stator mixer. The combined stream was cooled to approximately 6° C., conversion chemicals acetic anhydride (0.14 cm$^3$/cm$^3$ polymer solution) and 3-picoline (0.15 cm$^3$/cm$^3$ polymer solution) were metered in and mixed, and a film was cast using a slot die, onto a 90° C. hot, rotating drum. The resulting gel film was stripped off the drum and fed into a tenter oven, where it was dried and cured to a solids level greater than 98%, using convective and radiant heating. The base film contained 5 wt % carbon black and 3.5 wt % silica.

Results are shown in table 1.

Example 2

An alumina slurry was prepared, consisting of 41.7 wt % DMAC, 23.3 wt % polyamic acid prepolymer solution (20.6 wt % polyamic acid solids in DMAC), and 35.0 wt % alpha alumina powder with median particle size of approximately 2.2 microns. The ingredients were thoroughly mixed in a rotor stator, high-speed dispersion mill.

The alumina slurry was metered into a cooled (−7° C.) metered stream of the finished polymer/carbon black mixture of Example 1, along with the conversion chemicals, and a polyimide film was cast and cured using essentially the same process as Example 1. The resulting base film contains 5 wt % carbon black and 7 wt % alumina.

Results are shown in table 1.

Example 3

Carbon black and silica slurries were prepared as in Example 1. The slurries were mixed with PMDA/4,4'ODA prepolymer solution (20.6% polyamic acid solids, approximately 50 Poise viscosity), in amounts to yield 5 wt % carbon black and 2 wt % silica on a cured film basis. The mixture was finished by incrementally adding a 6 wt % solution of PMDA in DMAC, with mixing, to achieve a final viscosity of approximately 2250 Poise. The finished polymer mixture was vacuum degassed. Using a stainless steel casting rod, the polymer mixture was manually cast onto a Mylar® polyethylene terephthalate sheet attached to a glass plate. The Mylar® polyethylene terephthalate sheet containing the wet cast film was immersed in a bath consisting of a 50/50 mixture of 3-picoline and acetic anhydride. The bath was gently agitated for a period of 3 to 4 minutes in order to effect imidization and gellation of the film. The gel film was peeled from the Mylar® polyethylene terephthalate sheet and placed on a pin frame to restrain the film and prevent shrinking. After allowing for residual solvent to drain from the film, the pin frame containing the film was placed in a 120° C. oven. The oven temperature was ramped to 320° C. over a period of 60 to 75 minutes, held at 320° C. for 10 minutes, then transferred to a 400° C. oven and held for 5 minutes, then removed from the oven and allowed to cool.

Results are shown in table 1.

Example 4

The base film was prepared as in Example 3 with 3 wt % silica on a cured film basis.

Results are shown in table 1.

Example 5

A carbon black slurry was prepared as in Example 1. A synthetic barium sulfate (Blanc Fixe F, from Sachtleben Chemie GmbH) slurry was prepared, consisting of 51.7 wt % DMAC, 24.1 wt % prepolymer solution (20.6 wt % polyamic acid solids in DMAC) and 24.1 wt % barium sulfate powder. The ingredients were thoroughly mixed in a high shear rotor-stator type mixer. Median particle size was 1.3 microns.

The slurries were mixed with PMDA/4,4'ODA polyamic acid solution (20.6% polyamic acid solids, approximately 50 Poise viscosity), in amounts to yield 7 wt % carbon black and 10 wt % barium sulfate on a cured film basis. The mixture was finished by incrementally adding a 6 wt % solution of PMDA in DMAC, with mixing, to achieve a final viscosity of 2400 Poise. The finished polymer mixture was vacuum degassed. The polymer mixture was cast onto Mylar® polyethylene terephthalate sheet and chemically imidized and cured as described in Example 3.

Results are shown in table 1.

Comparative Example 1

Comparative example 1 demonstrates thermal conversion with the same amount of matting agent as in example 5, produces a high (undesirable) 60 degree gloss value on both sides of base film and low dielectric strength.

A carbon black slurry was prepared as in Example 1. A synthetic barium sulfate (Blanc Fixe F, from Sachtleben Chemie GmbH) slurry was prepared, consisting of 51.7 wt % DMAC, 24.1 wt % polyamic acid prepolymer solution (20.6 wt % polyamic acid solids in DMAC), and 24.1 wt % barium sulfate powder. The ingredients were thoroughly mixed in a high shear rotor-stator type mixer. Median particle size was 1.3 microns.

The slurries were mixed with PMDA/4,4'ODA prepolymer solution (20.6% polyamic acid solids, approximately 50 Poise viscosity), in amounts to yield 7 wt % carbon black and 10 wt % barium sulfate on a cured film basis. The mixture was finished by incrementally adding a 6 wt % solution of PMDA in DMAC, with mixing, to achieve a final viscosity of 1500 Poise. The finished polymer mixture was vacuum degassed. Using a stainless steel casting rod, a film was manually cast onto a glass plate. The glass plate containing the wet cast film was placed on a hot plate at 80-100° C. for 30-45 minutes to form a partially dried, partially imidized "green" film. The green film was peeled from the glass and placed on a pin frame. The pin frame containing the green film was placed in a 120° C. oven. The oven temperature was ramped to 320° C. over a period of 60-75 minutes, held at 320° C. for 10 minutes, then transferred to a 400° C. oven and held for 5 minutes, then removed from the oven and allowed to cool.

Results are shown in table 1.

Comparative Example 2

Comparative example 2 demonstrates thermal conversion with 4 weight % matting agent produces a high (undesirable) 60 degree gloss value on both sides of base film and has low dielectric strength.

Carbon black and silica slurries were prepared as in Example 1.

The slurries were mixed with PMDA/4,4'ODA prepolymer solution (20.6% polyamic acid solids, approximately 50 Poise viscosity), in amounts to yield 5 wt % carbon black and 4 wt % silica on a cured film basis. The mixture was finished by incrementally adding a 6 wt % solution of PMDA in DMAC, with mixing, to achieve a final viscosity of 2250 Poise. The finished polymer mixture was vacuum degassed. Using a stainless steel casting rod, a film was manually cast onto a glass plate. The glass plate containing the wet cast film was placed on a hot plate at 80-100° C. for 30-45 minutes to form a partially dried, partially imidized "green" film. The green film was peeled from the glass and placed on a pin frame. The pin frame containing the green film was placed in a 120° C. oven. The oven temperature was ramped to 320° C. over a period of 60-75 minutes, held at 320° C. for 10 minutes, then transferred to a 400° C. oven and held for 5 minutes, then removed from the oven and allowed to cool.

Results are shown in table 1.

Comparative Example 3

Comparative Example 3 demonstrates thermal conversion requires a higher amount of matting agent to produce a low 60 degree gloss value (matte appearance) on the air side yet has an undesirable 60 degree gloss value on the other (non air) side.

A carbon black slurry was prepared as in Example 1. An alumina slurry was prepared, consisting of 51.72 wt % DMAC, 24.14 wt % polyamic acid prepolymer solution (20.6 wt % polyamic acid solids in DMAC), and 24.14 wt % alpha alumina powder with median particle size of 2.3 microns. The ingredients were thoroughly mixed in a rotor stator, high-speed dispersion mill. The slurry was then milled in a ball mill to break down large agglomerates. The carbon black and alumina slurries were filtered to remove any residual large particles or agglomerates.

A PMDA/4,4'ODA prepolymer solution (20.6% polyamic acid solids, approximately 50 Poise viscosity) was "finished" by mixing in a high shear mixer with a 5.8 wt % PMDA solution in DMAC, in order to increase molecular weight and the viscosity to approximately 1500 Poise. The finished solution was filtered and mixed in a high shear mixer with the low conductivity carbon black and alumina slurries, along with additional PMDA finishing solution, and a small amount of a belt release agent (which enables the cast green film to be readily stripped from the casting belt). The quantity of PMDA finishing solution was adjusted to achieve a viscosity of 1200 Poise. The relative amounts of the polymer, slurries, and finishing solution were adjusted in order to achieve the desired loading levels of carbon black and alumina, and pressure at the casting die. The finished polymer/slurry mixture was pumped through a filter and to a slot die, where the flow was divided in such a manner as to form the outer layers of a three-layer coextruded film.

A second stream of PMDA/4,4'ODA prepolymer polymer solution, was finished in a high shear mixer to 1500 Poise viscosity and was pumped through a filter and to the casting die to form the middle, unfilled polyimide core layer of a three-layer coextruded film. The flow rates of the outer layers as well as the unfilled polyimide core layer solutions were adjusted in order to achieve the desired layer thickness.

A three-layer coextruded film was produced from the components described above by casting from the slot die onto a moving stainless steel belt. The belt was passed into a convective oven, to evaporate solvent and partially imidize the polymer, to produce a "green" film. Green film solids (as measured by weight loss upon heating to 300° C.) were 72.6%. The green film was stripped off the casting belt and wound up. The green film was then passed through a tenter oven to produce a cured polyimide film. During tentering, shrinkage was controlled by constraining the film along the edges. Cured film solids level (as measured by weight loss upon heating to 300° C.) was 98.8%.

The middle unfilled layer comprised 33% or ⅓ of the total thickness of the multilayer film and the outer layers contained alumina and low conductivity carbon black of equal thickness. The outer layers contained 7 wt low conductivity carbon black and 30 wt % alumina. Total film thickness was 0.49 mils.

Results are shown in table 1.

Comparative Examples 4 and 5 demonstrate some amount of matting agent is needed to achieve low 60 degree gloss value (matte appearance) on both sides of base film and further demonstrate that a matting agent with particle size below 1.3 microns gives a glossy base film.

Comparative Example 4

A carbon black slurry having a median particle size of 0.3 microns was prepared as in Example 1. The slurry was mixed with PMDA/4,4'ODA prepolymer solution (20.6% polyamic acid solids, approximately 50 Poise viscosity), in an amount to yield 7 wt % carbon black on a cured film basis. The mixture was finished by incrementally adding a 6 wt % solution of PMDA in DMAC, with mixing, to achieve a final viscosity of 1900 Poise. The finished polymer mixture was vacuum degassed. The polymer mixture was cast onto Mylar® polyethylene terephthalate sheet and chemically imidized and cured as described in Example 3.

Results are shown in table 1.

Comparative Example 5

To a metered stream of the finished polyamic acid/carbon black mixture of Example 1, additional carbon black slurry was metered, so as to increase the carbon black content to 7 wt % on a cured film basis, and the two steams were thoroughly mixed using a high shear rotor-stator mixer. A chemically imidized base film was produced as described in Example 1.

Results are shown in table 1.

Comparative Example 6

Comparative example 6 demonstrates chemical conversion with 30 wt % of $BaSO_4$ does show the expected decrease in dielectric strength compared with example 5 chemical conversion having 10 wt % $BaSO_4$. But surprisingly chemical conversion with 30 wt % of $BaSO_4$ has higher dielectric strength compared to comparative example 1 thermal conversion having 10 wt % $BaSO_4$.

A carbon black slurry was prepared as in Example 1. A synthetic barium sulfate (Blanc Fixe F, from Sachtleben Chemie GmbH) slurry was prepared, consisting of 51.7 wt % DMAC, 24.1 wt % prepolymer solution (20.6 wt % polyamic acid solids in DMAC) and 24.1 wt % barium sulfate powder. The ingredients were thoroughly mixed in a high shear rotor-stator type mixer. Median particle size was 1.3 microns.

The slurries were mixed with PMDA/4,4'ODA polyamic acid solution (20.6% polyamic acid solids, approximately 50 Poise viscosity), in amounts to yield 7 wt % carbon black and 30 wt % barium sulfate on a cured film basis. The mixture was finished by incrementally adding a 6 wt % solution of PMDA in DMAC, with mixing, to achieve a final viscosity of 2400 Poise. The finished polymer mixture was vacuum degassed. The polymer mixture was cast onto Mylar® polyethylene terephthalate sheet and chemically imidized and cured as described in Example 3.

Results are shown in table 1.

Examples 6-7 demonstrates lower amount of matting agent still achieves low 60 degree gloss value (matte appearance) on both sides of base film as well as high dielectric strength with chemical conversion.

Example 6

A chemically imidized black polyimide base film was prepared as in Example 1, except that the metering rate of silica slurry was reduced by 37%. Based on ash analysis the base film contained 2.2 wt % silica.

Results are shown in table 1.

Example 7

Carbon black and silica slurries were prepared as in Example 1. A PMDA/4,4'ODA prepolymer solution (20.6% polyamic acid solids, approximately 50 Poise viscosity) was "finished" by mixing in a high shear mixer with a 5.8 wt % PMDA solution in DMAC, in order to increase molecular weight and viscosity to approximately 2500 Poise. A metered stream of the finished polyamic acid solution was cooled to approximately −10° C. Similarly cooled metered streams of conversion chemicals acetic anhydride (0.18 cm3/cm3 polymer solution) and 3-picoline (0.17 cm3/cm3 polymer solution), along with metered streams of carbon black (0.095 cm3/cm3 polymer solution) and silica slurries (0.029 cm3/cm3 polymer solution), were mixed with a high shear mixer into the polyamic acid solution. The cooled mixture was filtered and immediately cast into a film, using a slot die, onto a 105° C. hot, rotating drum. The resulting gel film was stripped off the drum and fed into a tenter oven, where it was dried and cured to a solids level greater than 98%, using convective and radiant heating. The base film contained approximately 5.5 wt % carbon black. Based on ash analysis the film contained 1.8 wt % silica.

Results are shown in table 1.

Example 8

A carbon black slurry was prepared as in Example 1. An alumina slurry was prepared as in Comparative Example 3. The slurries were mixed with PMDA/4,4'ODA prepolymer solution (20.6% polyamic acid solids, approximately 50 Poise viscosity), in amounts to yield 5 wt % carbon black and 10 wt % alumina on a cured film basis. The mixture was finished by incrementally adding a 6 wt % solution of PMDA in DMAC, with mixing, to achieve a final viscosity of 1900 Poise. The finished polymer mixture was vacuum degassed. The polymer mixture was cast onto Mylar® polyethylene terephthalate sheet and chemically imidized and cured as described in Example 3.

Results are shown in table 1.

Comparative Example 7

Comparative Example 7 demonstrates thermal conversion using the same amount of matting agent used in example 8 produces a high (undesirable) 60 degree gloss value on both sides of base film and has a low dielectric strength.

A carbon black slurry was prepared as in Example 1. An alumina slurry was prepared as in Comparative Example 3. The slurries were mixed with PMDA/4,4'ODA prepolymer solution (20.6% polyamic acid solids, approximately 50 Poise viscosity), in amounts to yield 5 wt % carbon black and 10 wt % alumina on a cured film basis. The mixture was finished by incrementally adding a 6 wt % solution of PMDA in DMAC, with mixing, to achieve a final viscosity of 1900 Poise. The finished polymer mixture was vacuum degassed. A film was cast and thermally imidized as described in Comparative Example 2.

Results are shown in table 1.

Comparative Examples 8 and 9 demonstrate amount of matting agent above 1.5 weight % was needed to achieve low 60 degree gloss value (matte appearance) on both sides of the base film.

Comparative Example 8

The base film was prepared as in example 3 with 1 wt % silica on a cured film basis.

Results are shown in table 1.

Comparative Example 9

The base film was prepared as in example 3 with 1.5 wt % silica on a cured film basis.

Results are shown in table 1.

Comparative Examples 10 and 11 demonstrate that there is a lower limit to the matting agent median particle size to achieve low 60 degree gloss value.

Comparative Example 10

A carbon black slurry was prepared as in Example 1. An alumina slurry was prepared, consisting of 81.4 wt % DMAC, 8.3 wt % PMDA/BPDA/4,4'-ODA/PPD prepolymer solution (14.5 wt % polyamic acid solids in DMAC), 0.1 wt % of a dispersing agent and 10.2 wt % fumed alumina powder. The ingredients were thoroughly mixed in a rotor stator, high-speed dispersion mill. The slurry was then milled in a media mill to break down large agglomerates and achieve a median particle size of about 0.35 µm. The slurries were mixed with PMDA/4,4'ODA prepolymer solution (20.6% polyamic acid solids, approximately 50 Poise viscosity), in amounts to yield 5 wt % carbon black and 2 wt % alumina on a cured film basis. The mixture was finished by incrementally adding a 6 wt % solution of PMDA in DMAC, with mixing, to achieve a final viscosity of 2150 Poise. The finished polymer mixture was vacuum degassed. The polymer mixture was cast onto Mylar® polyethylene terephthalate sheet and chemically imidized and cured as described in Example 3.

Results are shown in table 1.

Comparative Example 11

A anhydrous dicalcium phosphate (CaHPO4) slurry was prepared, consisting of 11.5 wt % dicalcium phosphate, 64.7 wt % polyamic acid prepolymer solution (20.6 wt % polyamic acid solids in DMAC), and 23.8 wt % DMAC. The ingredients were thoroughly mixed in a high shear rotor-stator type mixer. Median particle size was 1.25 microns.

The dicalcium phosphate slurry was metered into and mixed with a cooled (−8° C.) metered stream of the finished polymer/carbon black mixture of Example 1, along with the conversion chemicals, and a polyimide film was cast and cured using essentially the same process as Example 1. The resulting base film contained 5 wt % carbon black and 2.8 wt % dicalcium phosphate.

Results are shown in table 1.

Comparative Example 12

Comparative Example 12 demonstrates a high density matting agent will produce a high (undesirable) 60 degree gloss value on both sides of base film.

A carbon black slurry was prepared as in Example 1. A barium titanate (Sakai, BT-05) slurry was prepared, consisting of 75 wt % DMAC, 10 wt % polyamic acid prepolymer solution (20.6 wt % polyamic acid solids in DMAC), and 15 wt % barium titanate powder. The ingredients were thoroughly mixed in a high shear rotor-stator type mixer and then sonicated to achieve a median particle size of 1.5 microns.

The slurries were mixed with PMDA/4,4'ODA prepolymer solution (20.6% polyamic acid solids, approximately 50 Poise viscosity), in amounts to yield 5 wt % carbon black and 2 wt % barium titanate on a cured film basis. The mixture was finished by incrementally adding a 6 wt % solution of PMDA in DMAC, with mixing, to achieve a final viscosity of 1500 Poise. The finished polymer mixture was vacuum degassed. The polymer mixture was cast onto Mylar® polyethylene terephthalate sheet and chemically imidized and cured as described in Example 3.

Results are shown in table 1.

Examples 9, 10 and 11

The base films were prepared as in Example 3, except the amount of silica slurry was adjusted to yield 5 wt %, 7.5 wt %, and 10 wt % silica respectively on a cured film basis.

Results are shown in table 1.

Examples 12 and 13

The films were prepared as in Example 1. The slurries were mixed with PMDA/4,4'ODA prepolymer solution (20.6% polyamic acid solids, approximately 50 Poise viscosity), in amounts to yield 5 wt % carbon black and 2.2 wt % silica on a cured film basis. The mixture was finished, cast into film, chemically imidized, and cured as described in Example 1. Conditions were adjusted to produce 2 mil and 5 mil thick base films.

Results are shown in table 1.

Examples 14 and 15

Silica powder (Syloid® C 803) was processed in an air classifier in order to remove a portion of the largest particles. A slurry was prepared from the air classified silica as described in Example 1. Median particle size was 2.1 microns. A carbon black slurry was prepared as in Example 1. The carbon black and silica slurries were mixed with PMDA/4,4'ODA prepolymer solution (20.6% polyamic acid solids, approximately 50 Poise viscosity), in amounts to yield 5 wt % carbon black and 2 wt % and 4 wt % silica on a cured film basis. The mixtures were finished and the base film was prepared as in Example 3.

Results are shown in table 1.

Example 16

Example 16 demonstrates that chemical conversion using a different low conductivity carbon black still achieves low 60 degree gloss value (matte appearance) on both sides of base film as well as high dielectric strength.

A carbon black slurry was prepared, consisting of 80 wt % DMAC, 10 wt % prepolymer solution (20.6 wt % polyamic acid solids in DMAC), and 10 wt % channel-type carbon black with 6% volatiles content (Printex U, from Evonik Degussa). The ingredients were thoroughly mixed in a rotor stator disperser. The slurry was then processed with an ultrasonic processor (Sonics & Materials, Inc., Model VCX-500) in order to deagglomerate the carbon black. Silica slurry was prepared as in Example 1. The slurries were mixed with PMDA/4,4'ODA prepolymer solution (20.6% polyamic acid solids, approximately 50 Poise viscosity), in amounts to yield 5 wt % carbon black and 2 wt % silica on a cured film basis. The mixture was finished by incrementally adding a 6 wt % solution of PMDA in DMAC, with mixing, to achieve a final viscosity of 2250 Poise.

The procedure described in Example 3 was used to prepare the chemically imidized base film.

Results are shown in table 1.

Comparative Example 13

Comparative Example 13 demonstrates thermal conversion with the same amount of matting agent as in Example 16, produces a high (undesirable) 60 degree gloss value on both sides of base film and low dielectric strength.

The slurries were prepared as in Example 16. The finished polymer mixture was manually cast onto a glass plate using a stainless steel casting rod. The glass plate containing the wet cast film was placed on a hot plate at 80-100° C. for 30-45 minutes to form a partially dried, partially imidized "green" film. The green film was peeled from the glass and placed on a pin frame. The pin frame containing the green film was placed in a 120° C. oven. The oven temperature was ramped to 320° C. over a period of 60-75 minutes, held at 320° C. for 10 minutes, then transferred to a 400° C. oven and held for 5 minutes, then removed from the oven and allowed to cool.

Results are shown in table 1.

Example 17

Example 17 demonstrates that chemical conversion using a different low conductivity carbon black still achieves low 60 degree gloss value (matte appearance) on both sides of base film as well as high dielectric strength.

The base film was prepared as in example 16 except that the carbon black slurry was prepared from a furnace black with 3.5% volatiles content (Special Black 550, from Evonik Degussa).

Results are shown in table 1.

Comparative Example 14

Comparative Example 14 demonstrates thermal conversion with the same amount of matting agent as in example 17, produces a high (undesirable) 60 degree gloss value on both sides of base film and low dielectric strength.

The base film was prepared as in comparative example 13 except that the carbon black slurry was prepared from a furnace black with 3.5% volatiles content (Special Black 550, from Evonik Degussa).

Results are shown in table 1.

Example 18

Example 18 demonstrates that chemical conversion using a different low conductivity carbon black still achieves low 60 degree gloss value (matte appearance) on both sides of base film as well as high dielectric strength.

The base film was prepared as in example 16 except that the carbon black slurry was prepared from a furnace black with 1.2% volatiles content (Printex 55, from Evonik Degussa).

Results are shown in table 1.

Comparative Example 15

Comparative Example 15 demonstrates thermal conversion with the same amount of matting agent as in example 18, produces a high (undesirable) 60 degree gloss value on both sides of base film and low dielectric strength.

The base film was prepared as in Comparative Example 13 except that the carbon black slurry was prepared from a furnace black with 1.2% volatiles content (Printex 55, from Evonik Degussa).

Results are shown in table 1.

Comparative Example 16

Comparative Example 16 demonstrates that desirable 60 degree gloss value on the air side of the base film can be achieved with thermal conversion by using a high loading (30 weight %) of matting agent, but the other side of the base film has high (undesirable) 60 degree gloss value and that the dielectric strength is low.

Carbon black and silica slurries were prepared as in Example 1. The slurries were mixed with PMDA/4,4'ODA prepolymer solution (20.6% polyamic acid solids, approximately 4500 Poise viscosity), in amounts to yield 5 wt % carbon black and 30 wt % silica on a cured film basis. The mixture was adjusted to a viscosity of 300 Poise by incrementally adding a 6 wt % solution of PMDA in DMAC, with mixing. The finished polymer mixture was vacuum degassed.

Using a stainless steel casting rod, a film was manually cast onto a glass plate. The glass plate containing the wet cast film was placed on a hot plate at 80-100° C. for 30-45 minutes to form a partially dried, partially imidized "green" film. The green film was peeled from the glass and placed on a pin frame. The pin frame containing the green film was placed in a 120° C. oven. The oven temperature was ramped to 320° C. over a period of 60-75 minutes, held at 320° C. for 10 minutes, then transferred to a 400° C. oven and held for 5 minutes, then removed from the oven and allowed to cool.

Results are shown in table 1.

TABLE 1

| | Conv. | wt % low conductivity carbon black | wt % matting agent | matting agent D50 (microns) | matting agent Density g/cc | Air side 60 degree gloss | other side 60 degree gloss | Air side surface resistivity (ohm/sq) | Dielectric strength (V/mil) | Thickness (mils) | Thickness (microns) | O.D. |
|---|---|---|---|---|---|---|---|---|---|---|---|---|
| 1 | chemical | 5% SB4 | 3.5% silica | 2.0 | 2.1 | 12.5 | 12.3 | 1.32E+15 | 2664 | 0.60 | 15.20 | 4.31 |
| 2 | chemical | 5% SB4 | 7% alumina | 2.3? | 3.9 | 22.4 | 26.0 | 1.11E+15 | 3102 | 0.58 | 14.7 | 3.64 |
| 3 | chemical | 5% SB4 | 2% silica | 2.0 | 2.1 | 27.0 | 31.2 | 9.30E+14 | 2668 | 0.74 | 18.8 | 4.88 |
| 4 | chemical | 5% SB4 | 3% silica | 2.0 | 2.1 | 15.9 | 18.7 | 1.60E+15 | 1951 | 1.11 | 28.2 | 5.86 |
| 5 | chemical | 7% SB4 | 10% BaSO4 | 1.3 | 4.4 | 17.4 | 25.2 | 1.69E+15 | 1411 | 1.40 | 35.60 | 6.02 |
| c1 | thermal | 7% SB4 | 10% BaSO4 | 1.3 | 4.4 | 70.4 | 91.1 | | <500 | 0.63 | 16 | 5.85 |
| c2 | thermal | 5% SB4 | 4% silica | 2.0 | 2.1 | 71.3 | 76.0 | 8.97E+14 | <500 | 1.06 | 26.9 | 5.75 |
| c3 | thermal | 7% SB4 | 30% alumina | 2.3 | 3.9 | 27.6 | 61.3 | 1.14E+16 | 1403 | 0.49 | 12.4 | 4.31 |
| c4 | chemical | 7% SB4 | — | | | 83.7 | 94.0 | | 2394 | 1.35 | 34.3 | 6.09 |
| c5 | chemical | 7% SB4 | — | | | 113.7 | 112.1 | 8.43E+14 | 2968 | 0.52 | 13.2 | 4.78 |
| c6 | chemical | 7% SB4 | 30% BaSO4 | 1.3 | 4.4 | 3.3 | 5.0 | 8.57E+14 | 813 | 1.34 | 34 | 6.09 |
| 6 | chemical | 5% SB4 | 2.2% silica | 2.0 | 2.1 | 23.5 | 23.8 | 8.19E+15 | 2790 | 0.55 | 14 | 4.14 |
| 7 | chemical | 5.5% SB4 | 1.8% silica | 2.0 | 2.1 | 25.6 | 26.8 | 1.34E+15 | 2728 | 0.6 | 15.20 | 4.32 |
| 8 | chemical | 5% SB4 | 10% alumina | 2.3 | 3.9 | 19.9 | 23.4 | | 2505 | 0.75 | 19.1 | 4.79 |
| c7 | thermal | 5% SB4 | 10% alumina | 2.3 | 3.9 | 75.3 | 87.4 | | <500 | 1.42 | 36.1 | 6.07 |
| c8 | chemical | 5% SB4 | 1% silica | 2.0 | 2.1 | 47.8 | 53.1 | 9.36E+14 | 2404 | 0.92 | 23.4 | 5.62 |
| c9 | chemical | 5% SB4 | 1.5% silica | 2.0 | 2.1 | 44.7 | 50.4 | | 2776 | 0.67 | 17 | 4.02 |
| c10 | chemical | 5% SB4 | 2% fumed Al2O3 | 0.35 | 2.0 | 43.3 | 51.8 | | 2910 | 1.01 | 25.7 | 5.07 |
| c11 | chemical | 5% SB4 | 2.8% CaHPO4 | 1.25 | 2.9 | 69.1 | 68.9 | 1.36E+15 | 3131 | 0.52 | 13.2 | 3.41 |
| c12 | chemical | 5% SB4 | 2% barium titanate | 1.5 | 8.0 | 73.2 | 81.2 | | 2737 | 1.03 | 26.2 | 5.97 |
| 9 | chemical | 5% SB4 | 5% silica | 3.3-3.6 | 2.1 | 6 | 10.8 | 5.46E+15 | 2130 | 1.23 | 31.2 | >6 |
| 10 | chemical | 5% SB4 | 7.5% silica | 3.3-3.6 | 2.1 | 3.9 | 5.8 | 2.6E+16 | 1523 | 2.98 | 75.7 | >6 |
| 11 | chemical | 5% SB4 | 10% silica | 3.3-3.6 | 2.1 | 2.4 | 2.8 | 1.00E+15 | 1822 | 1.22 | 31.00 | >6 |
| 12 | chemical | 5% SB4 | 2.2% silica | 3.3-3.6 | 2.1 | 21.7 | 21.5 | 1.34E+15 | 2037 | 2.15 | 54.6 | >6 |
| 13 | chemical | 5% SB4 | 2.2% silica | 3.3-3.6 | 2.1 | 22.9 | 24.9 | 5.767E+15 | 1719 | 5 | 127 | >6 |
| 14 | chemical | 5% SB4 | 2% silica | 2.1 | 2.1 | 33.2 | 41.5 | 1E+16 | 2494 | 1.21 | 30.7 | >6 |
| 15 | chemical | 5% SB4 | 4% silica | 2.1 | 2.1 | 13.9 | 19.2 | 9.09E+15 | 2215 | 1.5 | 38.1 | >6 |
| 16 | chemical | 5% Printex U | 2% silica | 3.3-3.6 | 2.1 | 13.1 | 18.6 | 1.08E+15 | 2393 | 1.08 | 27.4 | 5.48 |
| c13 | thermal | 5% Printex U | 2% silica | 3.3-3.6 | 2.1 | 69.1 | 79.6 | 1.27E+15 | 1165 | 0.98 | 24.9 | 4.52 |
| 17 | chemical | 5% Special Black 550 | 2% silica | 3.3-3.6 | 2.1 | 11.1 | 12.4 | 8.64E+14 | 1525 | 1.43 | 36.3 | 1.78 |
| c14 | thermal | 5% Special Black 550 | 2% silica | 3.3-3.6 | 2.1 | 56.1 | 55.6 | 6.2E+15 | 461 | 1.47 | 37.3 | 1.56 |

TABLE 1-continued

| | Conv. | wt % low conductivity carbon black | wt % matting agent | matting agent D50 (microns) | matting agent Density g/cc | Air side 60 degree gloss | other side 60 degree gloss | Air side surface resistivity (ohm/sq) | Dielectric strength (V/mil) | Thickness (mils) | Thickness (microns) | O.D. |
|---|---|---|---|---|---|---|---|---|---|---|---|---|
| 18 | chemical | 5% Printex 55 | 2% silica | 3.3-3.6 | 2.1 | 9.8 | 11.0 | 6.18E+14 | 1594 | 1.44 | 36.6 | 2.13 |
| c15 | thermal | 5% Printex 55 | 2% silica | 3.3-3.6 | 2.1 | 45.7 | 45.3 | 1.51E+15 | 559 | 1.65 | 41.9 | 2.2 |
| c16 | thermal | 5% SB4 | 30% silica | 3.3-3.6 | 2.1 | 0.9 | 59.4 | 4.84E+13 | 288 | 0.86 | 21.8 | 5.74 |

Note that not all of the activities described above in the general description or the examples are required, that a portion of a specific activity may not be required, and that further activities may be performed in addition to those described. Still further, the order in which each of the activities are listed are not necessarily the order in which they must be performed. After reading this specification, the ordinary artisan will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose.

Accordingly, the specification and figures are to be regarded in an illustrative rather than a restrictive sense and all such modifications are intended to be included within the scope of the invention.

What is claimed is:

1. A matte finish base film with a 60 degree gloss value of from 2 to 35 comprising:
   A. a chemically converted polyimide in an amount from 71 to 96 weight percent of the base film, the chemically converted polyimide being derived from:
      a. at least 50 mole percent of an aromatic dianhydride, based upon a total dianhydride content of the polyimide, and
      b. at least 50 mole percent of an aromatic diamine based upon a total diamine content of the polyimide;
   B. a low conductivity carbon black present in an amount from 2 to 9 weight percent of the base film; and
   C. a matting agent which is silica that:
      a. is present in an amount from 1.6 to 10 weight percent of the base film,
      b. has a median particle size from 1.3 to 10 microns, and
      c. has a density from 2 to 4.5 g/cc.

2. The base film in accordance with claim 1 wherein:
   a. the aromatic dianhydride is selected from the group consisting of:
      pyromellitic dianhydride,
      3,3',4,4'-biphenyl tetracarboxylic dianhydride,
      3,3',4,4'-benzophenone tetracarboxylic dianhydride;
      4,4'-oxydiphthalic anhydride,
      3,3',4,4'-diphenyl sulfone tetracarboxylic dianhydride,
      2,2-bis(3,4-dicarboxyphenyl)hexafluoropropane,
      bisphenol A dianhydride, and
      mixtures thereof; and
   b. the aromatic diamine is selected from the group consisting of:
      3,4'-oxydianiline,
      1,3-bis-(4-aminophenoxy)benzene,
      4,4'-oxydianiline,
      1,4-diaminobenzene,
      1,3-diaminobenzene,
      2,2'-bis(trifluoromethyl)benzidene,
      4,4'-diaminobiphenyl,
      4,4'-diaminodiphenyl sulfide,
      9,9'-bis(4-amino)fluorine and mixtures thereof.

3. The base film in accordance with claim 1 wherein the chemically converted polyimide is derived from pyromellitic dianhydride and 4,4'-oxydianiline.

4. A multilayer film comprising the base film of claim 1 and an adhesive layer.

5. The multilayer film in accordance with claim 4, wherein the adhesive layer is an epoxy resin selected from the group consisting of: bisphenol A epoxy resin, cresol novolac epoxy resin, phosphorus containing epoxy resin, and mixtures thereof.

6. The multilayer film in accordance with claim 4, wherein the multilayer film is a coverlay film.

7. The base film in accordance with claim 1, wherein the base film has a thickness from 8 to 152 microns.

8. A chemically converted polyimide base film with matte surfaces and a 60 degree gloss value of from 2 to 35 comprising:
   (1) a chemically converted polyimide in an amount from 71 to 96 weight percent of the base film, the chemically converted polyimide being derived from pyromellitic dianhydride and an aromatic diamine;
   (2) a low conductivity carbon black present in an amount from 2 to 9 weight percent of the base film; and
   (3) a silica matting agent present in an amount from 1.6 to 10 weight percent of the base film, wherein the matting agent has a median particle size from 1.3 to 10 microns, and a density from 2 to 4.5 g/cc.

9. The film in accordance with claim 8, having a thickness from 10 to 40 microns.

10. The film in accordance with claim 9, wherein the film has a thickness from 10 to 40 microns; a 60 degree gloss from 10 to 35; and an optical density greater than or equal to 2.

11. The film in accordance with claim 9, wherein the film is bidirectionally stretched.

12. The film in accordance with claim 8, wherein the film is unidirectionally stretched.

13. A reduced gloss, chemically converted polyimide film, comprising:
   (1) a chemically converted polyimide being derived from pyromellitic dianhydride and an aromatic diamine, wherein,
      (i) the polyimide film contains a low conductivity carbon black present in an amount from 2 to 9 weight percent of the film with a mean particle size from 0.2 to 1 micron and a volatile content greater than or equal to 5%;
(ii) the film contains a silica matting agent in an amount from 1.6 to 10 weight percent of the polyimide film with a median particle size from 1.3 to 10 microns and a density from 2 to 4.5 g/cc; and
(2) the polyimide film has a thickness from 10 to 40 microns, surfaces with a 60 degree gloss from 2 to 35; and an optical density greater than or equal to 2.

14. A reduced gloss, polyimide film, comprising:
a chemically converted polyimide film of pyromellitic dianhydride chemically converted with an aromatic diamine, the polyimide film has surfaces with a 60 degree gloss from 2 to 35 and uniform color intensity, a thickness from 10 to 40 microns, an optical density greater than or equal to 2, and contains a low conductivity carbon black with a volatile content greater than or equal to 5%, and an inorganic silica matting agent in an amount sufficient to achieve the reduced gloss, wherein said amount of inorganic silica matting agent is at least 20 percent less than an amount of inorganic silica matting agent required to achieve an equivalent level of reduced gloss in a thermally converted polyimide film.

15. The reduced gloss, polyimide film of claim 14, wherein said amount of inorganic silica matting agent is at least 30 percent less than an amount of inorganic silica matting agent required to achieve an equivalent level of gloss in a thermally converted polyimide film.

16. The reduced gloss, polyimide film of claim 14, wherein said amount of inorganic silica matting agent is at least 40 percent less than an amount of inorganic silica matting agent required to achieve an equivalent level of gloss in a thermally converted polyimide film.

* * * * *